Feb. 21, 1939. A. W. CRAMTON 2,147,691
SEALING MEANS FOR REVOLVING SHAFTS
Filed March 7, 1936
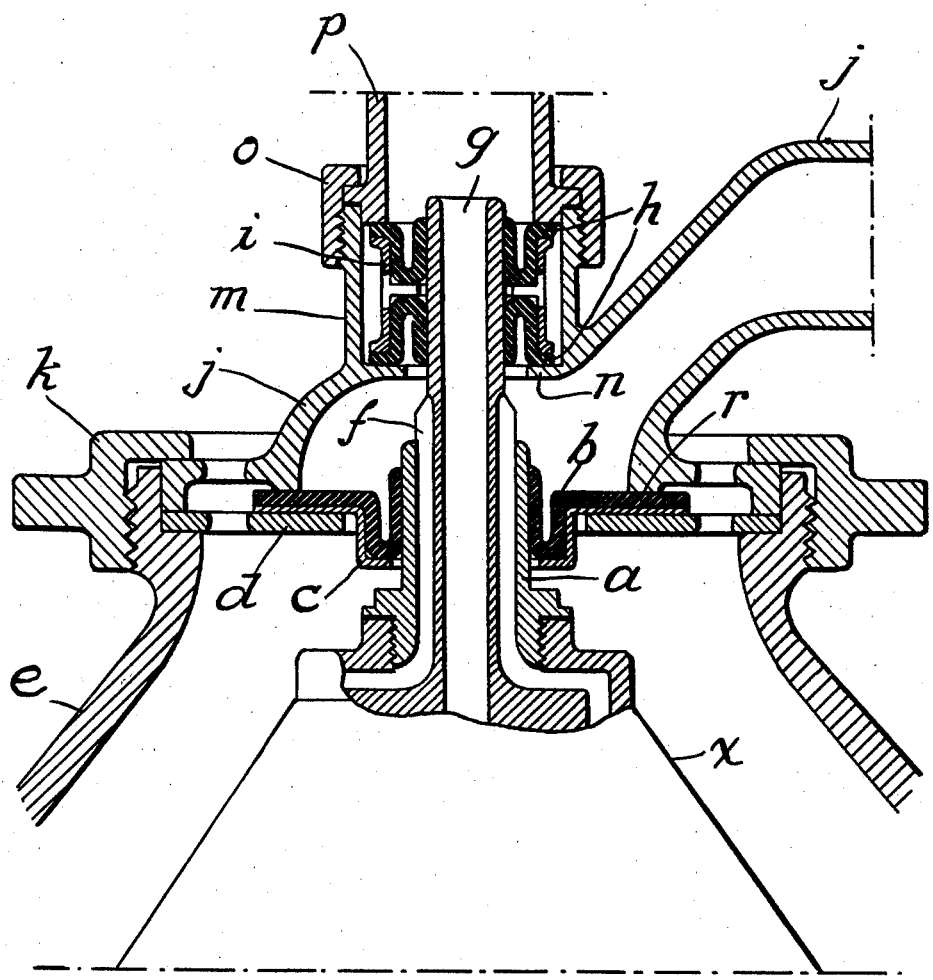
INVENTOR
Arthur W. Cramton Patented Feb. 21, 1939

2,147,691

UNITED STATES PATENT OFFICE 2,147,691

SEALING MEANS FOR REVOLVING SHAFTS

Arthur W. Cramton, Middletown Springs, Vt., assignor to The De Laval Separator Company, New York, N. Y., a corporation of New Jersey Application March 7, 1936, Serial No. 67,609

8 Claims. (Cl. 233—1)

My invention relates to packing means for readily revolving shafts that are liable to be accidentally displaced from the center of surrounding parts and to vibrate at times. The invention is especially adapted to flexible and elastic packing means for centrifugal separators, particularly those of the "closed" or "air-tight" type, in which the packing means comprises a fluid-tight flexible and elastic collar surrounding the shaft and secured in position by surrounding stationary members, as disclosed, for example, in the Lindgren Patents No. 1,969,226, dated August 7, 1934, and No. 2,002,954, dated May 28, 1935. In packing means of this character, displacement or vibration of the rapidly revolving shaft must be taken care of by the inherent flexibility and elasticity of the collar, which may suffer serious deformation by pressure. The more specific object of the present invention is to provide packing means that will be self-centering to the shaft; that is, to allow the sealing collars to accommodate themselves to any off-center position that the revolving shaft may assume, due either to errors in manufacture or to unbalanced loading of the separator bowl or to any other condition, without imposing upon the seals any undue pressure likely to produce their substantial deformation or excessive strain or wear upon the revolving shaft.

The accompanying drawing is a vertical sectional view containing an embodiment of the invention, the same comprising the upper part of a centrifugal separator bowl, showing the outlet tubes thereof and supporting means therefor embodying my improvement.

The skim milk discharge tube or hollow shaft $a$ of the bowl $x$ revolves inside a flexible and elastic sealing member or collar $b$, which is preferably of rubber, or a rubber body with an inner asbestos or fibrous lining. The sealing member $b$ is U-shaped in cross-section, the inner cylindrical portion engaging the shaft and the outer cylindrical portion having an annular flat flange. The seal $b$ is held in place by a cup or ring $c$ which conforms generally to the shape of that part of the seal $b$ other than its inner tube-engaging collar portion. Cup $c$ is supported on a stationary plate $d$, which is conveniently held in the upper part of a hopper $e$ secured to the frame of the machine (not shown).

Through the skim milk tube $a$, and centralized therein by ribs $f$, extends a cream tube $g$, which revolves inside two flexible and elastic sealing members or collars $h, h$, having contours similar to that of sealing member $b$, both sealing members $h, h$ being held in place by a supporting and spacing cup or ring $i$.

The skim milk discharge elbow $j$ and the plate $d$ are held to the hopper $e$ by a nut $k$. Elbow $j$ has a downwardly projecting circular bead $r$, which presses tightly on the outer flange of the seal $b$ and clamps it and the cup $c$ securely against the supporting plate $d$.

The elbow also has an upwardly projecting cylindrical portion $m$ which surrounds and is spaced from the seals $h$ and their spacer $i$. At the bottom of the cylinder $m$ a flange $n$ projects inward below the seals $h$ and at the top a nut $o$ forces a flanged tubular member $p$ downward on the upper seal, clamping the seals and spacer tightly in place.

Because the hole in the plate $d$ is of greater diameter than the cylindrical portion of the cup $c$ and the cylinder $m$ is of greater diameter than the seals $h$ and the cup $i$, the seals can accommodate themselves to any off center position that the tubes $a$ and $g$ may have. Because the cup $c$ and the spacer ring $i$ closely fit the outside of the seals they provide supports that prevent the seals being seriously deformed by pressure. Because the seals are made of thin flexible material they will follow any slight eccentric running of the tubes due to errors in manufacture or to unbalanced loading of the separator bowl with slime from the milk.

It will be understood that the capacity of the surrounding seal-supporting and reinforcing cups $c$ and $i$ to move in a plane at right angles to the shaft is of special importance during the initial assembly and that in the final assembly operation it is of advantage, and may be essential, to securely fasten them against such movement; and in the specific embodiment herein disclosed, the described clamping means performs this function.

It may thus be seen that I have provided, for revolving shafts, sealing means that will accommodate itself to off center positions of the shafts, is strong to withstand pressures and will follow unavoidable vibrations of the shaft.

While I have described my sealing means in connection with the outlets of a centrifugal milk separator and while it is particularly applicable thereto, it is also adapted for application to other rapidly revolving shafts of machines presenting, in part or in whole, similar problems.

What I claim and desire to protect by Letters Patent is:

1. The combination with a centrifugal bowl and tubes integral therewith and communicating with the interior of the bowl and concentric with each other and with the axis of the bowl and a surrounding stationary structure, of seals adapted to surround and fit the respective tubes, and supporting and reinforcing members for the seal which are carried by the stationary structures and are bodily movable freely with said seals, during assembly, relative to the stationary structure at right angles to the axis of the bowl, and means which in the final assembly securely fasten said reinforcing members and the seals supported thereby against such bodily movement, said seals having inherent elasticity and flexibility adapting them, in the revolution of the bowl, to flex and thus accommodate themselves to normal displacement and vibrations of the rotary tubes.

2. The combination with a centrifugal bowl and tubes integral therewith communicating with the interior of the bowl and concentric with each other and with the axis of the bowl and a surrounding rigidly stationary structure, of flexible and elastic seals arranged to surround and fit the respective tubes, each of said seals during assembly being freely movable, relatively to the stationary structure, at right angles to the axis of the tubes, to assume a self-centered position relative to its tube, and means for securing said seals to the stationary structure in such assumed positions.

3. The combination with a revolvable centrifugal bowl, a shaft rotatable therewith and a rigidly stationary supporting member surrounding the shaft, of a seal surrounding and fitting the shaft, a supporting and reinforcing member for the seal adapted, during assembly, to bodily move freely with said seal, relative to the stationary member, at right angles to the shaft, and means which, in the final assembly operation, securely fasten the reinforcing member and the seal supported thereby against such bodily movement, said seal having inherent flexibility and elasticity adapting it, in the revolution of the shaft, to accommodate itself to normal displacements and vibrations thereof.

4. The combination, with a centrifugal bowl, a spindle on which it is mounted, and a bowl neck on the end of the bowl opposite its spindle-supported end, of means flexibly and elastically supporting the bowl neck so as to enable it to assume its own center of rotation if the same be not coincident with its geometric axis, the bowl neck being otherwise unsupported, said supporting means comprising a flexible and elastic sealing member having a cylindrical portion surrounding and fitting the shaft and adapted to flexibly follow eccentric movements thereof and a flat flanged portion, a comparatively rigid member which reinforces and supports the sealing member and has a flat portion engaging the flat flanged portion of the sealing member and which is movable during assembly, with said sealing member, at right angles to the bowl, and means, including devices having plane surfaces between which said flat portions of the sealing member and supporting member extend, which clamp said flat portions into rigid relationship with said stationary frame.

5. The combination with a cylindrical bowl and bowl neck, a spindle which engages the bowl at the end thereof opposite the neck and imparts rotation thereto, and means flexibly and elastically supporting the bowl neck to allow the bowl to vibrate and be displaced from its geometric axis, the neck of the bowl being otherwise unsupported, said supporting means comprising a flexible and elastic seal and an extension therefrom, a reinforcing member for the extension of the seal, and a stationary frame comprising members between which the seal and reinforcing member are clamped, the seal and reinforcing member being, during assembly, movable relatively to the stationary frame, at right angles to the axis of the bowl neck to assume a self-center position relative to its axis, thereby insuring against any departure during rotation of the bowl from the concentric relation of the bowl neck and its supporting means except that due to normal vibration and displacement under high speed of rotation.

6. The combination with a centrifugal bowl and a shaft rotatable therewith and partaking of the bowl's vibrations, of a seal arranged to surround and fit the shaft and adapted by its own inherent elasticity and flexibility to follow said vibrations, a comparatively rigid reinforcing member for the seal, means to so position the seal and its reinforcing member as to prevent undue pressure thereon tending to produce substantial deformation thereof, said means comprising a rigidly stationary seal-supporting member surrounding and spaced from the shaft to permit clearance, said seal and reinforcing member during assembly being freely movable, relatively to the stationary member, at right angles to the axis of the shaft, to assume a self-centered position relative to the shaft, and means for securing said seal and reinforcing member in such assumed position.

7. The combination with a centrifugal bowl, a shaft rotatable therewith and partaking of the bowl's vibrations and a rigidly stationary supporting member surrounding the shaft, of a seal surrounding and fitting the shaft and adapted by its own inherent elasticity and flexibility to follow said vibrations, a comparatively rigid member conforming to the seal and so reinforcing and supporting it as to assist it to resist fluid pressures, said seal and its reinforcing and supporting member being during assembly adapted to bodily move freely, relatively to the stationary member, at right angles to the axis of the shaft, to assume a self centered position relative to the shaft, thereby providing packing means that is self-centering relative to the shaft, and means which, in the final assembly operation, securely fasten the reinforcing member and the seal supported thereby against such bodily movement.

8. The combination with a centrifugal bowl and a shaft rotatable therewith and partaking of the bowl's vibrations, of a seal arranged to surround and fit the shaft and adapted by its own inherent elasticity and flexibility to follow said vibrations, said seal while in proper axial position on said shaft during assembly being, independently of its elasticity, freely bodily movable with said shaft at right angles to the axis thereof to assume a self-centered position relative to normal position of said shaft, means comprising a rigidly stationary seal supporting member surrounding and spaced from the shaft and seal to provide a radial clearance between the member and the seal, and means for securing the seal to the stationary member in its self-centered position when assembly is complete.

ARTHUR W. CRAMTON.